United States Patent [19]
Vertes et al.

[11] 3,932,580
[45] Jan. 13, 1976

[54] PROCESS FOR PURIFYING TECHNICAL GRADE MOLYBDENUM OXIDE

[75] Inventors: Michael A. Vertes, Weston, Conn.; Richard A. Ronzio, Golden, Colo.

[73] Assignee: Amax Inc., New York, N.Y.

[22] Filed: Oct. 21, 1974

[21] Appl. No.: 516,290

[52] U.S. Cl. .................... 423/56; 423/57; 423/58; 423/61; 423/593; 423/606
[51] Int. Cl.² ....................................... C01G 39/00
[58] Field of Search .................... 423/53, 56–58, 423/61, 593

[56] References Cited
UNITED STATES PATENTS

| | | | |
|---|---|---|---|
| 1,895,811 | 1/1933 | Morgan | 423/53 |
| 2,017,557 | 10/1935 | Winkler et al. | 423/53 |
| 2,965,447 | 12/1960 | Zimmerley et al. | 423/55 |
| 3,455,677 | 7/1969 | Litz | 423/54 |
| 3,458,277 | 7/1969 | Platzke et al. | 423/54 |
| 3,829,550 | 8/1974 | Ronzio et al. | 423/54 |
| 3,848,049 | 12/1974 | Ronzio et al. | 423/54 |

Primary Examiner—Herbert T. Carter
Attorney, Agent, or Firm—Harness, Dickey & Pierce

[57] ABSTRACT

A method for purifying technical grade molybdenum oxide derived from the roasting of molybdenite concentrates by which the molybdenum oxide feed material is admixed with sulfuric acid and pugged to form a plurality of reaction pellets which are heated to an elevated temperature to effect a baking and subsequent roasting thereof and a reaction between the metal contaminants and the sulfuric acid to produce aqueous soluble sulfate compounds. The resultant roasted pelletized oxide is ground and leached to remove the contaminating metal sulfates, whereafter the leached pellets are contacted with an aqueous ammoniacal solution for converting the molybdenum oxide constituent therein to ammonium molybdate dissolved in the solution, which is separated from the insoluble residue, which is discarded to waste and the solution is crystallized to recover the ammonium molybdate product which, in turn, may be calcined to produce a high purity molybdenum oxide product.

5 Claims, 1 Drawing Figure

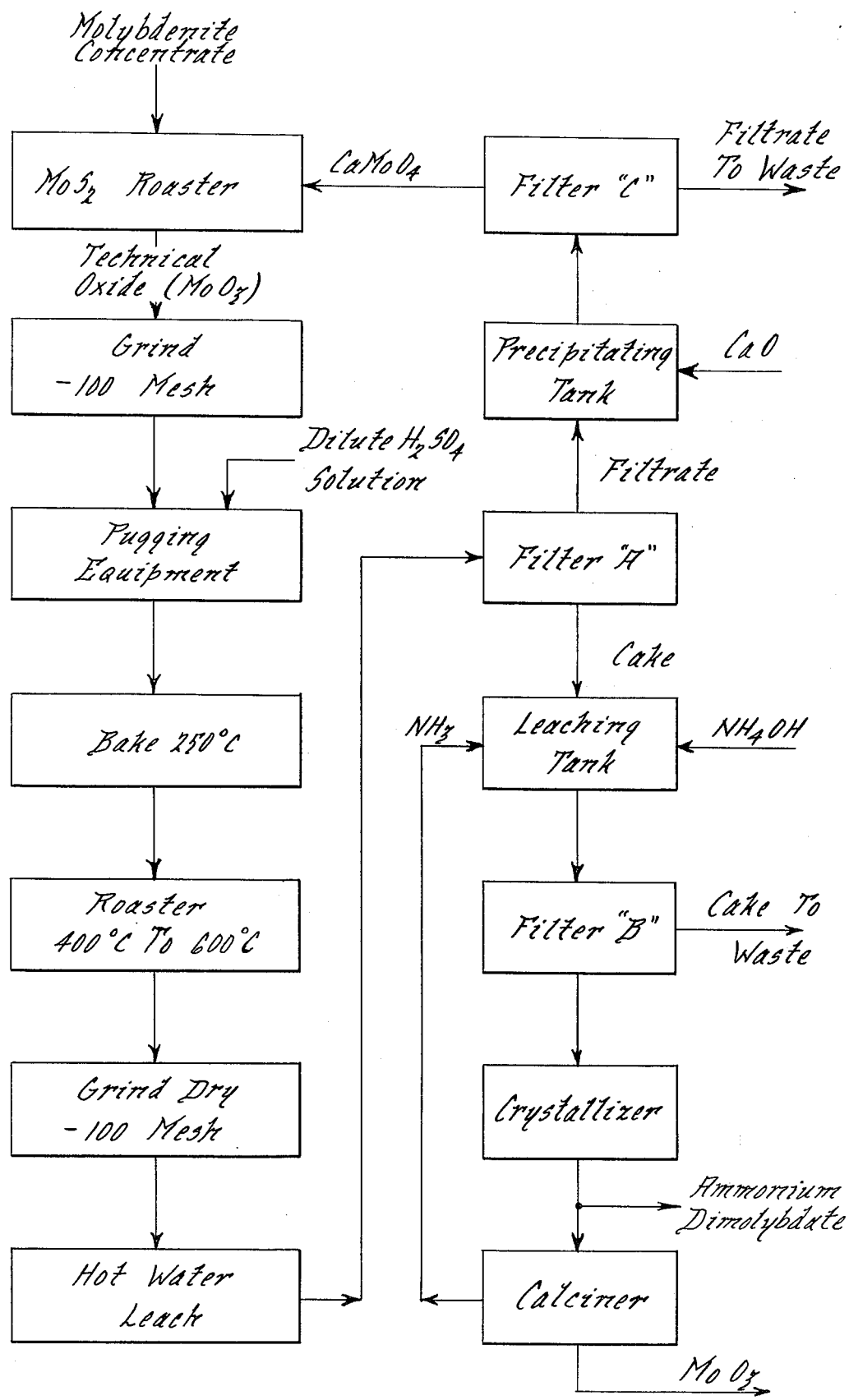

PROCESS FOR PURIFYING TECHNICAL GRADE MOLYBDENUM OXIDE

BACKGROUND OF THE INVENTION

Molybdenum is principally found in the earth's crust in the form of molybdenite ($MoS_2$) ditributed as very fine veinlets in quartz which is present in an ore body comprised predominantly of altered and highly silicified granite. The concentration of the molybdenite in such ore bodies is relatively low, that is, in amounts of about 0.1% by weight, and more usually, about 0.5% by weight. The molybdenite is present in the form of relatively soft, hexagonal, black flaky crystals which are extracted from the ore body and concentrated by any one of a variety of known beneficiation processes so as to increase the molybdenum disulfide content to a level of usually greater than about 80% by weight of the concentrate. The resultant concentrate is subjected to an oxidation step, which usually is performed by a roasting operation in the presence of air, whereby the molybdenum disulfide is converted to molybdenum oxide which is of a commercial or technical grade containing various impurities including metallic contaminants present in the original ore body.

It is desirable or necessary in some instances to provide a molybdenum trioxide product or molybdate compounds which are relatively free of such metallic contaminants providing a high purity material for use in the preparation of molybdenum compounds, catalysts, chemical reagents or the like, wherein the presence of contaminants, such as compounds of potassium, manganese, lead, tin, calcium, magnesium, silicon, iron, copper and aluminum, is detrimental. The production of high purity molybdenum oxide has heretofore been achieved by various chemical and physical refining techniques, of which the sublimation of the technical oxide at an elevated temperature such as about 1000°C or higher and recovering the sublimed molybdenum trioxide of a purity usually of about 99% or greater is perhaps the most common method. Unfortunately, the sublimation process is inefficient, producing a purified molybdenum trioxide in relatively low yields, necessitating a recycling and further processing of the residue to recover the residual molybdenum values therein, which still further detracts from the economics of the purification process.

Various chemical purification techniques, including multiple-stage leaching with various reagents, have heretofore been used or proposed for use which also have been unsatisfactory for one or more reasons. For example, selective leaching processes have been employed to which the technical oxide is subjected in a manner to selectively extract the major amounts of some of the contaminating constituents therein. A disadvantage of such plural leaching processes is the ineffectiveness of any one solution to remove substantially all of the deleterious naturally-occurring contaminating constituents in one step, necessitating a relatively tedious and time consuming plural leaching process which is not only costly and time consuming, but also results in a progressive reduction in the yield of the purified molybdenum product derived from the impure feed material.

The process of the present invention overcomes many of the problems and disadvantages associated with methods heretofore used or proposed for use enabling the production of relatively high purity ammonium dimolybdate and/or molybdenum trioxide in comparatively high yields and which utilizes processing conditions and equipment which are commercially efficient and economical.

SUMMARY OF THE INVENTION

The benefits and advantages of the present invention are achieved by a method in which an impure technical or commercial grade molybdenum oxide, such as derived from the air roasting of a molybdenite concentrate, is admixed with a controlled quantity of sulfuric acid, such as by pugging, and thereafter is heated to an elevated temperature to effect a reaction between the acid constituent and the contaminating metal constituents, and particularly the potassium constituent thereof. The heating of the pelletized feed material is preferably accomplished in two stages, including a baking stage in which the feed is heated to about 350°C, followed thereafter by an air roasting stage in which the feed is heated to a temperature of about 400°C to about 600°C. The resultant roasted and reacted material is ground to a particle size preferably less than about 100 mesh to facilitate a hot water leaching thereof and an extraction of the aqueous soluble metallic sulfate compounds formed. The leached feed material is extracted from the leach solution and thereafter is subjected to an ammoniacal leaching step by which the molybdenum constituent is converted to a soluble ammonium molybdate compound in the ammoniacal solution, which is separated from the insoluble residue and is crystallized to form a high purity ammonium dimolybdate product, or alternatively, is further calcined to produce a high purity molybdenum trioxide product.

It is also contemplated that any of the molybdenum values dissolved during the hot leaching of the roasted pelletized feed stock can be recovered by treatment with lime to produce a calcium molybdate product which is recovered and recycled to the molybdenite air roaster.

Further advantages and benefits of the present invention will become apparent upon a reading of the description of the preferred embodiments taken in conjunction with the accompanying drawing and the typical examples provided.

BRIEF DESCRIPTION OF THE DRAWING

The drawing comprises a schematic flow diagram of the steps of the purification process comprising the present invention in accordance with the preferred embodiments thereof.

DESCRIPTION OF THE PREFERRED EMBODIMENTS

The proportions and concentrations of the various feed materials and products, and the quantities of chemical reagents employed, are described in the specification and in the subjoined claims in terms of percentages by weight, unless clearly indicated to the contrary.

The purification process of the present invention commences with the provision of a commercial or technical grade oxide containing objectionable quantities of contaminating metals, of which potassium comprises a particularly objectionable constituent. The analysis of a technical grade roasted concentrate of molybdenum oxide derived from the roasting of a molybdenite concentrate at 600°C with excess air is as follows: 59.05% molybdenum; 2,500 ppm potassium, 380 ppm copper, 530 ppm magnesium and 600 ppm aluminum. The foregoing technical molybdenum oxide is typical of those derived from the air roasting of molybdenite concentrates derived from the oil flotation extraction of molybdenite from ore deposits in Climax, Colorado. The technical oxide can also be derived from alternative sources, although the most common source is from the beneficiation of molybdenite ore to form a concentrate which thereafter is roasted in a multiple-hearth furnace, such as a Herreshoff, McDougall, Wedge, Nichols, etc.

In accordance with conventional molybdenite beneficiation processes, the molybdenite containing ore is subjected to a grinding operation in which it is reduced to particles of an average size less than about 200 mesh, and the resultant pulverized ore is thereafter subjected to an oil flotation extraction operation utilizing hydrocarbon oil and pine oil in combination with various wetting agents, whereby the particles comprised predominantly of molybdenum disulfide are retained in the flotation froth, while the gangue materials comprised predominantly of silica remain in the tailings portion of the pulp. Normally, the flotation beneficiation process employs a series of successive flotation extraction operations including intervening grinding operations, whereby the residual gangue in the concentrate is reduced to a level usually less than about 10%, and preferably less than about 8% of the molybdenite concentrate.

The concentrate thus obtained is subjected to an air roasting in any one of the aforementioned commercially used multiple-hearth furnaces which comprise a plurality of annularshaped hearths disposed in vertically spaced relationship on which the molybdenite concentrate is progressively oxidized on moving downwardly in a cascading fashion from the uppermost hearth to the lowermost hearth while being exposed to a countercurrent flow of hot flue gases. The air roasting of the molybdenite concentrate to produce a technical molybdenum trioxide product comprises the first step of the flow diagram as shown in the drawing.

The roasted technical oxide is preferably ground to an average particle size of less than 100 mesh which can be accomplished with the feed material in a dry state or in a wet state. In the latter case, the grining media and mill is preferably completely lined or comprised of a nonferrous abrasion resistant material, such as rubber or ceramic, to avoid the formation of molybdenum blue which occurs during wet grinding of molybdenum trioxide in the presence of iron. Ordinarily, the molybdenite concentrate transferred to the roaster is of a particle size less than 100 mesh and usually less than 200 mesh. The grinding step following the roasting step is preferred in order to break up an agglomerates that may have formed and also to assure that all of the particles are less than 100 mesh. While the particle size of the roasted concentrate is not particularly critical, particles of an average size less than 100 mesh are preferred because of the large surface area of the feed material, facilitating a uniform mixture and contact thereof with the sulfuric acid reagent.

Following the grinding step, the technical oxide feed material, as shown in the flow diagram, is transferred to pugging equipment in which the material is pugged in the presence of a dilute sulfuric acid solution forming a thick paste which may conveniently be extruded into pellets or briquettes of sufficient green strength to enable handling and transfer thereof to the next baking operation. The quantity of sulfuric acid employed is dictated by the quantity of impurities present in the technical oxide feed material and the degree of purification desired. While on a stoichiometric basis, sulfuric acid can be employed in a stoichiometric ratio of about 1:1 based on the quantity of metallic impurities present, it is usually preferred to employ an excess of sulfuric acid in stoichiometric ratios such as up to about 5:1 to assure substantially complete reaction thereof with the contaminating metals. The specific concentration of the sulfuric acid solution used is controlled so as to provide for a uniform distribution of the sulfuric acid reagent and to provide sufficient water to produce a wetted mass suitable for mixing in the equipment employed, such as a pugging mill, which subsequently can be briquetted or pelletized into masses for facilitating its handling through the baking and roasting operations. Dilute sulfuric acid solutions containing from about 10% to about 25% acid are satisfactory in most instances.

The size of the pellets or briquettes produced is not critical and can vary depending on the type of equipment employed for the handling, baking and roasting operations in order to optimize efficiency. The shape or configuration of the pellets also is not critical and will vary depending upon the particular equipment employed to effect a pelletizing thereof. The porosity of the pelletized feed stock can vary from a relatively dense mass to one of a somewhat porous structure depending upon the specific particle size and packing characteristics of the molybdenum oxide feed material as well as the quantity of water present in the reaction mixture.

In any event, the resultant pelletized feed material incorporating the sulfuric acid reagent is transferred to a heated chamber to effect a gradual heating thereof to a temperature ranging from about 150°C to about 250°C, and typically, about 250°C, so as to effect a baking of the pellets, producing substantially dry, hard, high-strength porous bodies which are resistant to breakage and attrition upon subsequent handling. The baked pelletized feed stock thereafter is subjected to a roasting step, as shown in the flow diagram, in which they are heated to a higher temperature which is greater than about 300°C, and preferably ranges from about 400°C to about 600°C, at which the reaction between the sulfuric acid reagent and contaminating metals progresses at a commercially practical rate. The roasting step is carried out for a period of time usually ranging from about 0.5 hour to about 1.5 hours, and preferably from about one to about 1.5 hours, which assures that the reaction is substantially complete, whereafter the roasted pelletized material is subjected to a grinding operation to increase its surface area to facilitate the subsequent hot water leaching of the contaminating metal sulfate compounds formed. The grinding is preferably performed on a dry basis, in which the pellets are crushed and ground to an average particle size of less than about 100 mesh.

The pulverized reacted material, as indicated in the flow diagram, is thereafter leached with hot water in a manner to effect an extraction of substantially all of the aqueous soluble contaminating metal sulfates therefrom. This is conveniently achieved by forming a slurry of the ground roasted material in hot water at a temperature ranging from about 50°C to about 85°C having a solids concentration that can range from about 10% up to as high as 50%, but below that at which an excessive viscosity of the slurry occurs, detracting from its mixing and pumping characteristics. Preferably, the hot leaching is carried out employing about 20% to about 30% solids on a batchwise basis and in the presence of agitation to prevent stratification of the slurry.

At the completion of the hot aqueous leaching step, which may range from as little as one hour to as high as about three hours, and more usually about two hours, the slurry is transferred to a filter, such as filter A of the flow diagram, in which the filtrate and filter cake are separated. The filtrate containing the dissolved contaminating metal sulfates and a small proportion of dissolved molybdenum is transferred to a precipitating tank in which lime is added in the presence of agitation so as to effect the formation of an aqueous insoluble calcium molybdate compound. The precipitate is transferred to the filter C and the solid constituent thereof, comprising predominantly calcium molybdate, is separated and recycled back to the original molybdenite concentrate roaster while the filtrate containing the dissolving contaminating metal salts is discarded to a waste treatment system. The filter cake derived from the filter A in accordance with the flow diagram comprising molybdenum oxide in combination with other insoluble impurities such as silica, for example, is transferred to an alkali leaching tank to which an ammoniacal leach solution is added, effecting a progressive dissolving and extraction of the molybdenum constituents therein and a conversion thereof to ammonium molybdate. The ammoniacal leach solution includes ammonium hydroxide, which may range in concentration from about 10 to about 20%, and preferably is controlled to 10% above the stoichiometric requirement. The ammoniacal leaching step can be performed at ambient temperature. The leaching is carried out until substantially all of the molybdate values are converted to the soluble ammonium salt, whereafter the slurry is transferred to filter B and the cake comprising the solid residue comprised predominantly of silica is discarded to waste and the ammoniacal solution containing the dissolved ammonium salt is transferred to a crystallizer or evaporator to produce ammonium dimolybdate.

The ammonium dimolybdate can be recovered as a high purity product or, alternatively, can be further processed by transfer to a calciner to effect a decomposition thereof with subsequent recovery of a high purity molybdenum trioxide product. Calcination of the ammonium dimolybdate can be carried out at temperatures ranging from about 400°C to about 600°C, and preferably about 550°C, for time periods ranging from about one hour to about three hours. The ammonia liberated in the calcination step is transferred back to the ammoniacal leaching tank for reuse.

In order to further illustrate the process of the present invention, the following examples are provided. It will be understood that the examples are provided for illustrative purposes and are not intended to be limiting of the scope of the invention as hereinabove described and as set forth in the subjoined claims.

EXAMPLE 1

A technical molybdenum oxide feed material containing from 72% to 88% $MoO_3$, 0.25% to 0.5% potassium, 0.2% to 0.4% iron, 0.02% to 0.04% lead, 0.03% to 0.06% copper and 0.01% to 0.02% sodium is subjected to a grinding operation to provide a molybdenum oxide feed material of an average particle size of less than about 100 mesh. The resultant ground feed material is mixed with an aqueous solution of sulfuric acid containing 20% acid in an amount of 100 pounds of acid solution per ton of solid feed material. The resultant mixture is pugged in a pugging mill and is extruded in the form of cylindrical pellets of a diamter of about ¼-inch and a length of ⅜-inch, which are transferred to an oven and baked at a temperature of about 250°C for a period of 1.5 hours. The resultant baked pellets are thereafter transferred to a roaster in which they are heated in the presence of excess air to a temperature of 500°C for a period of 1.5 hours. The resultant roasted pellets are ground in a ball mill or other type apparatus (wet or dry) to an average particle size of less than about 100 mesh and the resultant powder, if dry ground, is mixed with hot water at a temperature of 85°C to form a slurry containing 20% solids. If wet ground, the water content is adjusted to provide a solids content of about 20% and the slurry thereafter is heated to a temperature of about 85°C. The hot water leaching is continued for a period of 1.5 hours under continuous agitation, whereafter the slurry is transferred to a filter and the cake recovered with the filtrate passing to a precipitation tank to which lime is added in the presence of agitation, whereafter a settling is allowed to occur. The settled precipitate is transferred to a filter and the cake recovered, which is analyzed and found to be predominantly calcium molybdate.

The filter cake derived from the filtration of the hot water leached feed material is thereafter leached with an ammoniacal solution containing about 15% ammonium hydroxide, which is employed in an amount to provide about 10% excess of ammonium hydroxide above that stoichiometrically required to react with the molybdenum oxide present at ambient temperature and at a solids content of about 20% for a period of four hours. The resultant leached material is thereafter transferred to a filter and the filter cake, comprising predominantly silica and other insoluble silicious gangue materials, is discarded to waste; while the filtrate, comprising an ammoniacal solution containing ammonium molybdate, is transferred to a crystallizer. Crystals of ammonium dimolybdate product are recovered, evidencing a yield based on the original technical oxide feed material of about 99.8%. A portion of the purified ammonium dimolybdate product is subjected to a further calcination treatment at a temperature of 600°C for a period of 2 hours to produce a high purity molybdenum trioxide product. The purified molybdenum trioxide product on analysis contained the following residual metallic impurities: potassium, less than 100 ppm; iron, less than 10 ppm; lead, less than 10 ppm; copper, 10 ppm; and sodium, 5 ppm.

While it will be apparent that the preferred embodiments of the invention disclosed are well calculated to fulfill the objects above stated, it will be appreciated that the invention is susceptible to modification, variation and change without departing from the spirit thereof.

What is claimed is:

1. A process for purifying molybdenum trioxide which comprises the steps of providing an impure particulated molybdenum trioxide feed material of a particle size less than about 100 mesh, mixing feed material with sulfuric acid in an amount sufficient to provide a stoichiometric excess of sulfuric acid relative to the metallic impurities present in said feed material to form a reaction mixture, agglomerating said reaction mixture into pellets, heating said pellets to a temperature up to about 250°C for a period of time sufficient to effect a baking thereof, heating the baked said pellets to an elevated temperature of from 400°C up to about 600°C in air to effect a roasting thereof and to cause a reaction to occur between the metallic impurities in said feed material and the sulfuric acid to form aqueous soluble sulfate compounds, pulverizing the roasted said pellets into a powder of an average particle size less than about 100 mesh, leaching the said powder with hot water at a temperature above about 50°C to extract the sulfate compounds therefrom, separating the leached said powder from the resultant hot water leaching solution, contacting the leached said poweder with an aqueous ammoniacal leach solution to extract the molybdenum trioxide constituent therein forming a solution containing ammonium molybdate and an insoluble residue, separating said solution containing ammonium molybdate from said residue and recovering the ammonium dimolybdate constituent from said solution.

2. The method as defined in claim 1, including the further step of treating the separated said hot water leaching solution with lime and precipitating the dissolved molybdenum values therein as an aqueous insoluble calcium molybdate compound and recovering said calcium molybdate compound and recycling it to a molybdenite roaster.

3. The method as defined in claim 1, in which the step of recovering the ammonium dimolybdate constituent from said aqueous ammoniacal leach solution is performed by crystallization.

4. the method as defined in claim 1, in which the the step of separating the ammonium dimolybdate from said aqueous ammoniacal leach solution is performed by crystallization and including the further step of calcining the crystallized separated ammonium molybdate to a high purity molybdenum trioxide product.

5. The method as defined in claim 1, in which the concentration of the sulfuric acid reagent is controlled relative to the quantity of metallic impurities in said feed material to provide a stoichiometric ratio of sulfuric acid in excess of 1:1 up to 5:1.

* * * * *